(12) United States Patent
Kohara

(10) Patent No.: US 7,383,448 B2
(45) Date of Patent: Jun. 3, 2008

(54) POWER MANAGEMENT APPARATUS, PRINTER, FILE SERVER, PRINTING SYSTEM AND COMPUTER SOFTWARE

(75) Inventor: Ryoko Kohara, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 670 days.

(21) Appl. No.: 10/405,360

(22) Filed: Apr. 3, 2003

(65) Prior Publication Data

US 2003/0191975 A1 Oct. 9, 2003

(30) Foreign Application Priority Data

Apr. 9, 2002 (JP) ............................. 2002-106439
Aug. 8, 2002 (JP) ............................. 2002-231567

(51) Int. Cl.
  *G06F 1/00* (2006.01)
  *G06F 1/26* (2006.01)
  *G06F 1/32* (2006.01)
(52) U.S. Cl. ........................ 713/300; 713/320
(58) Field of Classification Search ................ 713/300, 713/320, 321, 323, 330, 340
See application file for complete search history.

(56) References Cited

U.S. PATENT DOCUMENTS

| | | | | |
|---|---|---|---|---|
| 5,914,788 A * | 6/1999 | Tomida | ........................ | 358/434 |
| 6,009,243 A * | 12/1999 | Kim | ........................ | 358/1.15 |
| 6,509,975 B1 * | 1/2003 | Motegi | ........................ | 358/1.14 |
| 6,587,953 B1 * | 7/2003 | Torikai | ........................ | 713/330 |
| 6,724,493 B1 * | 4/2004 | Maruta et al. | ........................ | 358/1.14 |
| 6,987,578 B2 * | 1/2006 | Alexander | ........................ | 358/1.15 |
| 2003/0018921 A1 * | 1/2003 | Garcia et al. | ........................ | 713/300 |

FOREIGN PATENT DOCUMENTS

| | | |
|---|---|---|
| JP | 58-12033 | 1/1983 |
| JP | 2000-172474 | 6/2000 |
| JP | 2001-199131 | 7/2001 |

* cited by examiner

*Primary Examiner*—Rehana Perveen
*Assistant Examiner*—Michael J Brown
(74) *Attorney, Agent, or Firm*—Nixon & Vanderhye, PC

(57) ABSTRACT

A power management apparatus 1 for managing power supply to a plurality of printers 31 to 33 connected to a plurality of host 21 to 23 over a network 5, the power management apparatus 1 comprising: a host-operation-state monitoring module 116 for monitoring whether or not the hosts 21 to 23 are powered on; a host-specific-priority-setting module 111 for setting priority of each of the printers 31 to 33 for each of the hosts 21 to 23; a printer information calculation module 113 for aggregating the set host-specific priorities to calculate priority of each of the printers 31 to 33 by taking the operation state of the hosts 21 to 23 into account; a printer power supply determination module 114 for determining whether or not each printer should be powered on; and a printer power supply control module 115 for remotely controlling power supply to each printer 31 to 33 on the basis of determination on whether or not each printer 31 to 33 should be powered on.

24 Claims, 19 Drawing Sheets

FIG. 8

|          | HOST 1 | HOST 2 | HOST 3 |
|----------|--------|--------|--------|
| PRINTER A | 3 | 2 | 1 |
| PRINTER B | 5 | 7 | 1 |
| PRINTER C | 2 | 1 | 8 |

FIG. 9

|        | POWER |
|--------|-------|
| HOST 1 | ON |
| HOST 2 | ON |
| HOST 3 | ON |

|           | NECESSITY |
|-----------|-----------|
| PRINTER A | 6  |
| PRINTER B | 13 |
| PRINTER C | 11 |

|        | POWER |
|--------|-------|
| HOST 1 | OFF |
| HOST 2 | ON |
| HOST 3 | ON |

(b)

|           | NECESSITY |
|-----------|-----------|
| PRINTER A | 3 |
| PRINTER B | 8 |
| PRINTER C | 9 |

FIG. 11

|  | POWER |
|---|---|
| HOST 1 | ON |
| HOST 2 | ON |
| HOST 3 | OFF |

|  | NECESSITY |
|---|---|
| PRINTER A | 5 |
| PRINTER B | 12 |
| PRINTER C | 3 |

FIG. 14

|  | HOST 1 | HOST 2 | HOST 3 | .... | HOST n |
|---|---|---|---|---|---|
| PRINTER A | 1 | 2 | 1 | ... | 0 |
| PRINTER B | 5 | 7 | 1 | ... | 0 |
| PRINTER C | 2 | 1 | 8 | ... | 0 |
| ... | ... | ... | ... | ... | ... |
| PRINTER Z | 0 | 0 | 0 | ... | 0 |
| A3 | 0 | 0 | 0 | ... | 0 |
| RECYCLED | 0 | 0 | 0 | ... | 0 |
| COLOR | 0 | 0 | 0 | ... | 30 |
| ... | ... | ... | ... | ... | ... |
| DUPLEX | 4 | 0 | 0 | ... | 0 |
| ... | ... | ... | ... | ... | ... |

| | POWER |
|---|---|
| HOST 1 | ON |
| HOST 2 | ON |
| HOST 3 | ON |
| ... | ... |
| HOST n | OFF |

(b)

| | PRIORITY |
|---|---|
| PRINTER A | 8 |
| PRINTER B | 13 |
| PRINTER C | 11 |
| ... | ... |
| PRINTER Z | 4 |

| | POWER |
|---|---|
| HOST 1 | OFF |
| HOST 2 | ON |
| HOST 3 | ON |
| ... | ... |
| HOST n | OFF |

(b)

| | PRIORITY |
|---|---|
| PRINTER A | 3 |
| PRINTER B | 8 |
| PRINTER C | 9 |
| ... | ... |
| PRINTER Z | 0 |

| | POWER |
|---|---|
| HOST 1 | ON |
| HOST 2 | ON |
| HOST 3 | OFF |
| ... | ... |
| HOST n | OFF |

(b)

| | PRIORITY |
|---|---|
| PRINTER A | 7 |
| PRINTER B | 12 |
| PRINTER C | 3 |
| ... | ... |
| PRINTER Z | 4 |

FIG. 19

(a) SCHEDULE DATA (1 ITEM)

> EVENT NAME: XX MEETING, APRIL
> LOCATION: MEETING ROOM NO.1 AT YY CENTER
> START: 2002.04.25 13:00
> END: 2002.04.25 17:00
> ...
> HANDOUT STORAGE LOCATION: (SHARED SERVER)¥¥
> XXMEETING¥APRIL
> HANDOUT DISTRIBUTION DATE AND TIME: -
> ...

(b) FILE

> (FILE ATTRIBUTES)
> FILE NAME: (FILE a)
> ENTRY DATE AND TIME: 2002.03.04 10:37
> UPDATE DATE AND TIME: 2002.03.26 19:15
> ...
> USER ID: 012345
> ...
> PRINT CONDITIONS: DUPLEX, RECYCLED PAPER
> ...
>
> (FILE DATA)
> ...
> ...

(c) USER DATA FILE

| USER ID | USER NAME | HOST ID |
|---------|-----------|---------|
| 001123 | XXXX | (HOST DEVICE 1) |
| ........ | ........ | ........ |
| 003579 | ΔΔΔΔ | (HOST DEVICE 2) |
| ........ | ........ | ........ |
| 012345 | ○○○○ | (HOST DEVICE 3) |
| ........ | ........ | ........ |
| 034567 | □□□□ | (HOST DEVICE n) |

FIG. 20

(a) (NORMALLY)

|  | HOST 3 |
|---|---|
| PRINTER A | 1 |
| PRINTER B | 1 |
| PRINTER C | 8 |
| ... | ... |
| PRINTER Z | 0 |
| A3 | 0 |
| RECYCLED | 0 |
| COLOR | 0 |
| ... | ... |
| DUPLEX | 0 |
| ... | ... |

(b) (DAY BEFORE EVENT)

|  | HOST 3 |
|---|---|
| PRINTER A | 0 |
| PRINTER B | 0 |
| PRINTER C | 4 |
| ... | ... |
| PRINTER Z | 0 |
| A3 | 0 |
| RECYCLED | 18 |
| COLOR | 0 |
| ... | ... |
| DUPLEX | 12 |
| ... | ... |

SCHEDULE DATA (1 ITEM)

EVENT NAME: SUBMISSION OF HANDOUT FOR XXMEETING, APRIL
PLACE: -
START: 2002.04.22 17:00
END: 2002.04.22 17:00
...
HANDOUT STORAGE LOCATION:
　　　　　　　　　　(HOST 1)¥¥XXMEETING¥APRIL¥FILEa
DISTRIBUTION DATE AND TIME: -
...

POWER MANAGEMENT APPARATUS, PRINTER, FILE SERVER, PRINTING SYSTEM AND COMPUTER SOFTWARE

BACKGROUND OF THE INVENTION

The present invention relates to a power management apparatus, a printer, a file server, a printing system and computer software and, in particular, to a printing system in which a plurality of printer are shared among a plurality of host apparatuses such as a computers, and a method for controlling the printing system.

DESCRIPTION OF THE RELATED ART

An automatic power supply apparatus is proposed in Japanese Patent Laid-Open No. 2000-172474 that automatically detects the end of operation of all computers that use a network printer to turn off the network printer.

Japanese Patent Laid-Open No. 2001-199131 proposes assigning priorities to printers and determining control of power shutoff and energy-saving mode on the basis of the frequency and intervals of printing.

In reality, however, energy is wasted to turn off all the printers shared on a network only after termination of operation of all computers.

Many printers had to be turned on while they are waiting for the termination of operation of several computers.

Furthermore, in the latter disclosure in which printers to be left turned on are determined on the basis of the priority or frequency of use of the printers, the setting values are averages determined from day-to-day usage and therefore cannot accommodate variations in usage at different times.

Japanese Patent Laid-Open No. 2000-172474 mentioned above does not discloses any measures for addressing a case where a number of printers are shared among a number of hosts.

Also, the technology disclosed in Japanese Patent Laid-Open No. 2000-172474 causes energy waste because all printers are left turned on until the termination of operation of the last host is recognized.

Japanese Patent Laid-Open No. 2001-199131 assumes that a plurality of printers are shared among a plurality of hosts. However, printers to be placed in energy-saving mode are determined from their priorities and frequencies of use. Therefore, although previous usage of the printers can be reflected in their setting, the setting is not always best suited to possible usage at any given time.

SUMMARY OF THE INVENTION

To solve these problems, a first object of the present invention is to provide a power management apparatus, a printer, and a printing system, wherein only those printers which are likely to be required by hosts such as computers are left active, or a number of printers that is proportional to the number of hosts in the power-on state are left active, to improve usability and provide an energy saving effect.

A second object of the present invention is to provide a power management apparatus, a file server, a printing system and a computer software, wherein required functions (performance) of a plurality of printers can be specified together with (or instead of) printer priorities for each host as data for determining power management of the plurality of printers shared by a plurality of hosts, and required functions (performance) associated with specific tasks scheduled can be automatically and temporarily set as data for determining power management.

According to the present invention, printers used by each host and their priorities (degrees of need) are set in advance, the power-on/off state of the hosts is checked as proposed in Japanese Patent Laid-Open No. 2001-199131, printers that are found to be of lower priority on the basis of cumulative printer priority for each of active hosts are turned off, and the frequencies of use of the printers are learned so that the printers can be activated and stopped with consideration given to the pattern of printer usage by each host.

That is, the present invention provides a power management apparatus for managing power supply to a plurality of printers connected to a plurality of hosts over a network, the power management apparatus comprising: a host-operation-state monitoring module for monitoring whether or not the hosts are powered on; a host-specific-priority-setting module for setting priority of each of the printers for each of the hosts; a printer information calculation module for aggregating the set host-specific priorities to calculate priority of each of the printers by taking the operation state of the hosts into account; a printer power supply determination module for determining whether or not each printer should be powered on; and a printer power supply control module for remotely controlling power supply to each printer on the basis of determination whether or not the printer should be powered on.

This power management apparatus can save users from labor and save energy in the entire network by determining the need for a printer from the priority for each host and the operation state of the host to perform power management.

The present invention also provides a printer that has power management capability and is connected to a plurality of hosts and one or more printers over a network, the printer comprising: a host-operation-state monitoring module for monitoring whether or not the hosts are powered on; a host-specific-priority-setting module for setting priorities for each of the printers for each of the hosts; a printer information calculation module for aggregating the set host-specific priorities to calculate priority of each of the printers by taking the operation state of the hosts into account; a printer power supply determination module for determining whether or not each printer should be powered on; and a printer power supply control module for remotely controlling power supply to each printer on the basis of determination whether or not the printer should be powered on.

Thus, the printer itself can determine a required printer on the basis of the priority for each host and the operation state of the host to perform power management, thereby saving users from labor and also saving energy in the entire network without the provision of a power management apparatus (server).

In the power management apparatus or the printer of the present invention, the printer power supply determination module determines that a printer need not be powered on if the calculated priority of the printer is lower than a preset printer priority or an active-host-count-based priority determined by the number of active hosts.

Thus, power management based on the priority for each host can be performed. Printers unlikely to be used by the hosts are turned off and printers required by users are kept powered on so that energy in the entire network can be saved and the usability and convenience of the network can be improved.

Furthermore, in the power management apparatus or the printer of the present invention, the printer power supply determination module determines that a number of top-priority printers should be activated and that the other lower-priority printers need not be activated, the number of top-priority printers to be activated being determined by taking the number of active hosts into account.

Thus, printers having an equal priority can be prioritized so that the waste of leaving many printers active can be eliminated, thereby saving energy in the entire network.

The present invention also provides a printing system comprising the power management apparatus, a plurality of hosts and a plurality of printers.

This can save users from labor and save energy in the entire network by determining the need for a printer from the priority for each host and the operation state of the host to perform power management.

The present invention also provides a printing system comprising a plurality of printers, including the printer having power management capability, wherein a control unit in a printer determined as being the most required printer performs power management for the plurality of printers interconnected over a network.

Thus, control can be provided such that a printer that has power management capability and higher priority and therefore is more likely to continue operating can perform power management even though a plurality of printer shave power management capability.

Furthermore, traffic of packet transmission for checking the operation states of the hosts can be reduced because power management is performed by a single printer.

In the printing system of the present invention, each of the hosts includes a printer priority setting module for setting priorities of each of the printers for the host.

Thus, printer priorities for each host can be set according to usage of the printers without the need for a user to manipulate the power management apparatus (or a printer having power management capability).

Furthermore, in the printing system, a printer having a power management apparatus or power management control capability has the capability of notifying the hosts that the printer is turned off and the hosts have the capability of receiving the notification and determining whether or not a printer set by the hosts as a default printer is turned off and the capability of changing the default printer to the printer for which the highest priority is set among printers being powered on.

Thus, there is no need for the user to reset a printer to use, and therefore, labor of the user is saved.

The power management apparatus according to the present invention further comprises a print data management module for mediating print data sent from each host to each printer and a printer information storage for storing information about the amount of print data sent from each host to each printer, wherein the printer information calculation module calculates the information about the amount of the print data and reflects the result of the calculation in the setting of the host-specific priority.

Thus, energy saving setting can be provided that matches real usage of the hosts.

Furthermore, in the printing system according to the present invention, a printer to be turned off because the printer is of low priority and less necessity is turned off after the end of spooling if the printer is spooling print data or after the completion of printing if the printer is in printing.

Thus, data in a printing process is not canceled and therefore convenience for the user can be improved.

The present invention also provides a power management apparatus for managing through a network power supply to a plurality of printers connected to a plurality of hosts over the network, the power management apparatus comprising: a host-operation-state monitoring module for monitoring whether or not the hosts are powered on; a host-specific-priority-setting module for setting priority of each of the printers and priority of a function of the each printer for each of the hosts; a printer information calculation module for aggregating the set host-specific priorities to calculate priority of each of the printers by taking the operation state of the hosts into account; a printer power supply determination module for determining whether or not each printer should be activated; and a printer power supply control module for remotely controlling power supply to each printer on the basis of determination whether or not the printer should be activated.

Thus, the priority of each printer for each host and a function (performance) of the printer for each printer can be set in the host-specific-priority setting module to specify that a printer having the function (performance) required for the user's job should be turned on in advance.

Furthermore, in the power management apparatus according to the present invention, the host-specific-priority setting module sets the priority of each printer and the priority of the function of the each printer for each host by using points owned by the each host, the points used for setting the priority of the each printer have a rate (weight) different from that of the points used for setting the priority of the function of the printer.

Required functions of a printer is more likely to be determined by requirements in a user's job rather than a whim or preference of the user.

Therefore, a rate (weight) different from that of the points for setting the priority of the printers are assigned to the priorities of functions of the printers so that the points for setting the priorities of the printer functions become heavier. This can ensure that a printer having the functions required for the user's job is turned on.

The present invention also provides a file server connected to the power management apparatus over the network; the file server comprising: schedule management means for converting a specified printer function into the priority of the printer function for a host on the basis of a schedule data file with which an event handout file capable of storing information about a user and a printer function specified as a printing condition and an event start date and time are associated and a user information file storing information associating with the host, and for reporting the converted priority to the host-specific-priority setting module of the power management apparatus prior to the event start data and time.

A printer having the functions required for the user's job can be automatically turned on by indicating the functions specified as print conditions to the host-specific-priority setting module as priorities before the event start date and time written in the schedule data file.

Furthermore, in the file server according to the present invention, the schedule management means indicates the host-specific-priority setting module of the power management apparatus to reset the priority to a preset priority in a predetermined time after an event end date and time if the event end date and time is further associated with the event end date and time.

The priorities of the printers can be automatically reset to the state usually set after the event ends because the schedule management means indicates the host-specific-priority setting module to reset the priorities to the preset priorities in a predetermined time after the event end date and time.

Furthermore, in the file server according to the present invention, the schedule management means indicates the priority to the host-specific-priority setting module of the power management apparatus on the basis of a handout distribution date and time instead of the event start date and time if the event handout distribution date and time is associated with the schedule data file.

Thus, printer functions specified as print conditions can be notified to the host-specific-priority-setting module as priorities before the event handout distribution date and time so that the printer is not affected by the start date and time of the event specified in the schedule data file if a user wants to distribute the handout prior to the event.

The present invention also provides a printing system comprising the power management apparatus described above, plurality of hosts, and a plurality of printers, all being interconnected over a network.

A favorable job environment can be provided to the user by providing the printing system in which the priorities of the printers and the priorities of functions of the printers can be set for the plurality of host over the network.

The present invention also provides a printing system comprising the power management apparatus described above, a plurality of hosts, a plurality of printers, and the file server described above, all being interconnected over a network.

A favorable job environment can be provided with a user the printing system in which the priorities of the printers and the priority of functions of the printers can be automatically set for the plurality of hosts by the file server.

The present invention also provides computer software comprising a program for causing a computer to implement the function as the printer power supply control module in the power management apparatus described above.

BRIEF DESCRIPTION OF THE DRAWINGS

FIG. 8 illustrates an example of host-specific-priority-setting module data in the printing system according to the first embodiment of the present invention;

FIG. 9 illustrates an example of a printer information calculation module data in the printing system according to the first embodiment of the present invention;

FIG. 10 illustrates a second example of printer information calculation module data in the printing system according to the first embodiment of the present invention;

FIG. 11 illustrates a third embodiment of the printer information calculation module in the printing system according to the first embodiment of the present invention;

FIG. 14 illustrates an example of point allocation by a host-specific-priority-setting module in the printing system according to the fourth embodiment of the present invention;

FIG. 15 illustrates a first exemplary result of calculation by a printer information calculation module in the printing system according to the fourth embodiment of the present invention;

FIG. 16 illustrates a second exemplary result of calculation by the printer information calculation module in the printing system according to the fourth embodiment of the present invention;

FIG. 17 illustrates a third exemplary result of calculation by the printer information calculation module in the printing system according to the fourth embodiment of the present invention;

FIG. 19 illustrates an example of a schedule data file in the printing system according to the fifth embodiment of the present invention;

FIG. 20 illustrates an example of host-specific-priority-setting module data in the printing system according to the fifth embodiment of the present invention;

DETAILED DESCRIPTION OF THE PREFERRED EMBODIMENTS

Embodiments of the present invention will be described. Embodiments of a power management apparatus, a printer, and a printing system according to the present invention will be described.

Referring to FIGS. 1 to 11, preferred embodiments of the present invention will be detailed below.

Figure 1:
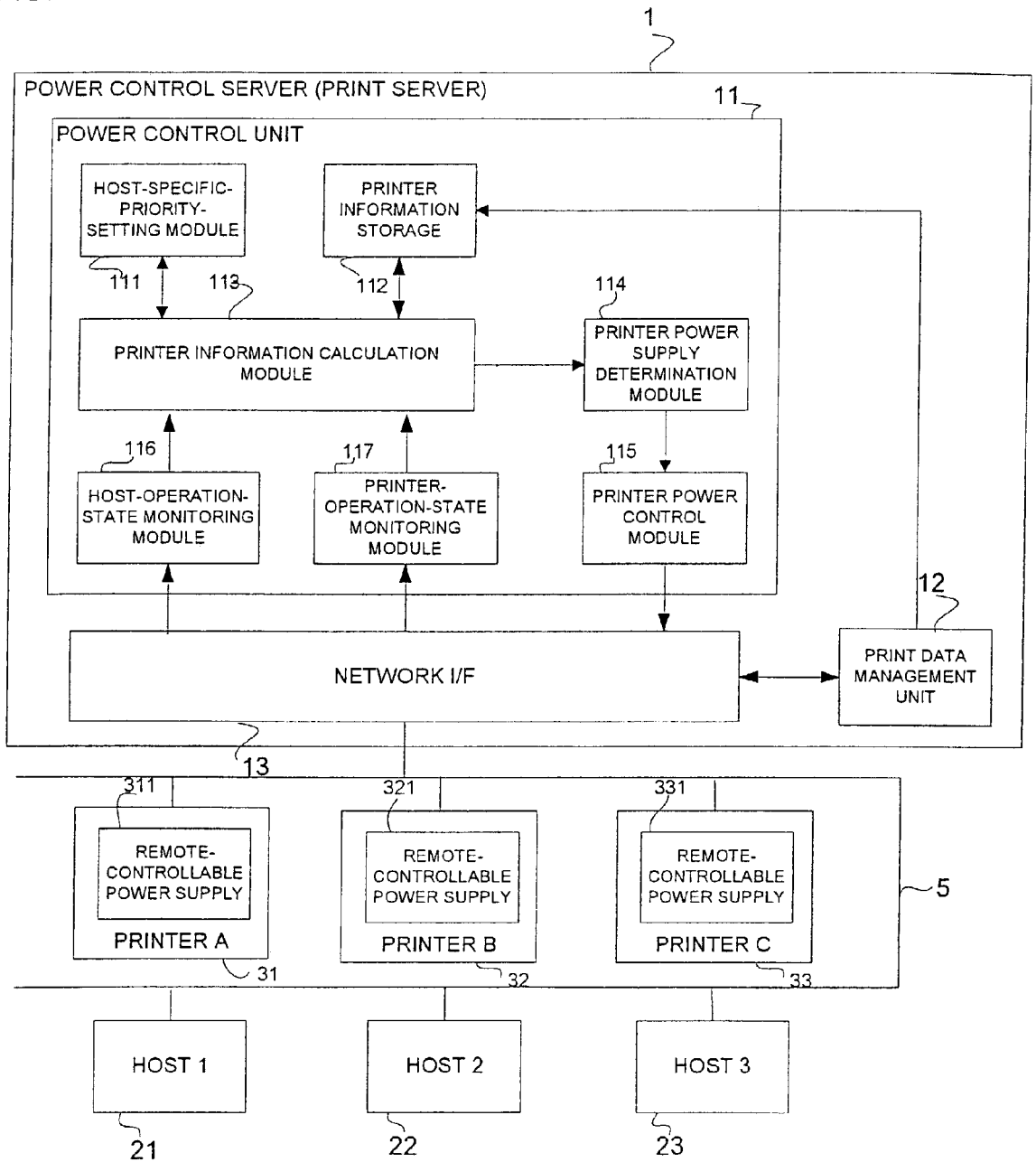
FIG. 1 is a block diagram showing a configuration of a printing system according to a first embodiment of the present invention.
Figure 2:
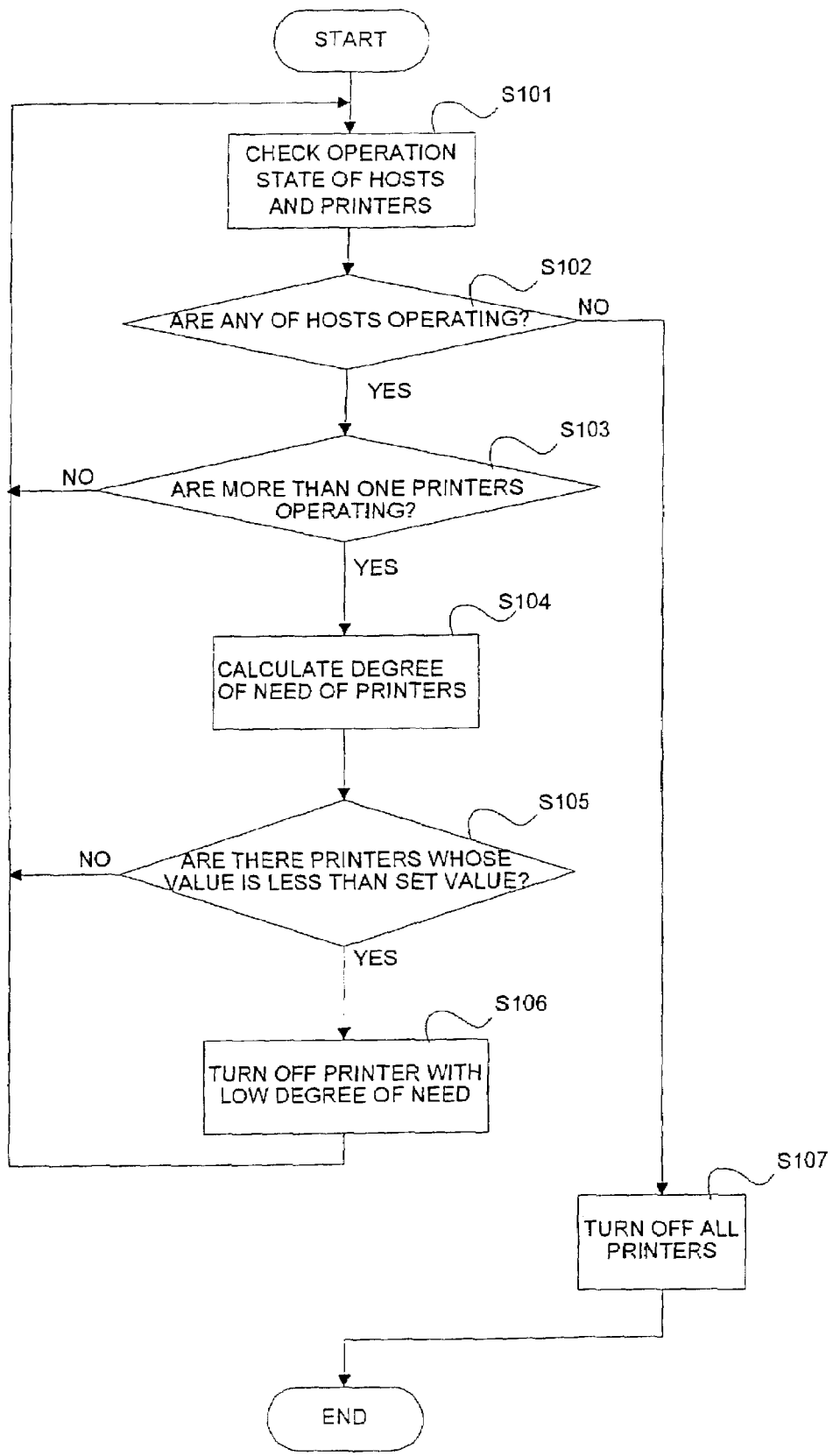
FIG. 2 is a flowchart showing control in a power management apparatus in the printing system according to the first embodiment of the present invention.
Figure 3:
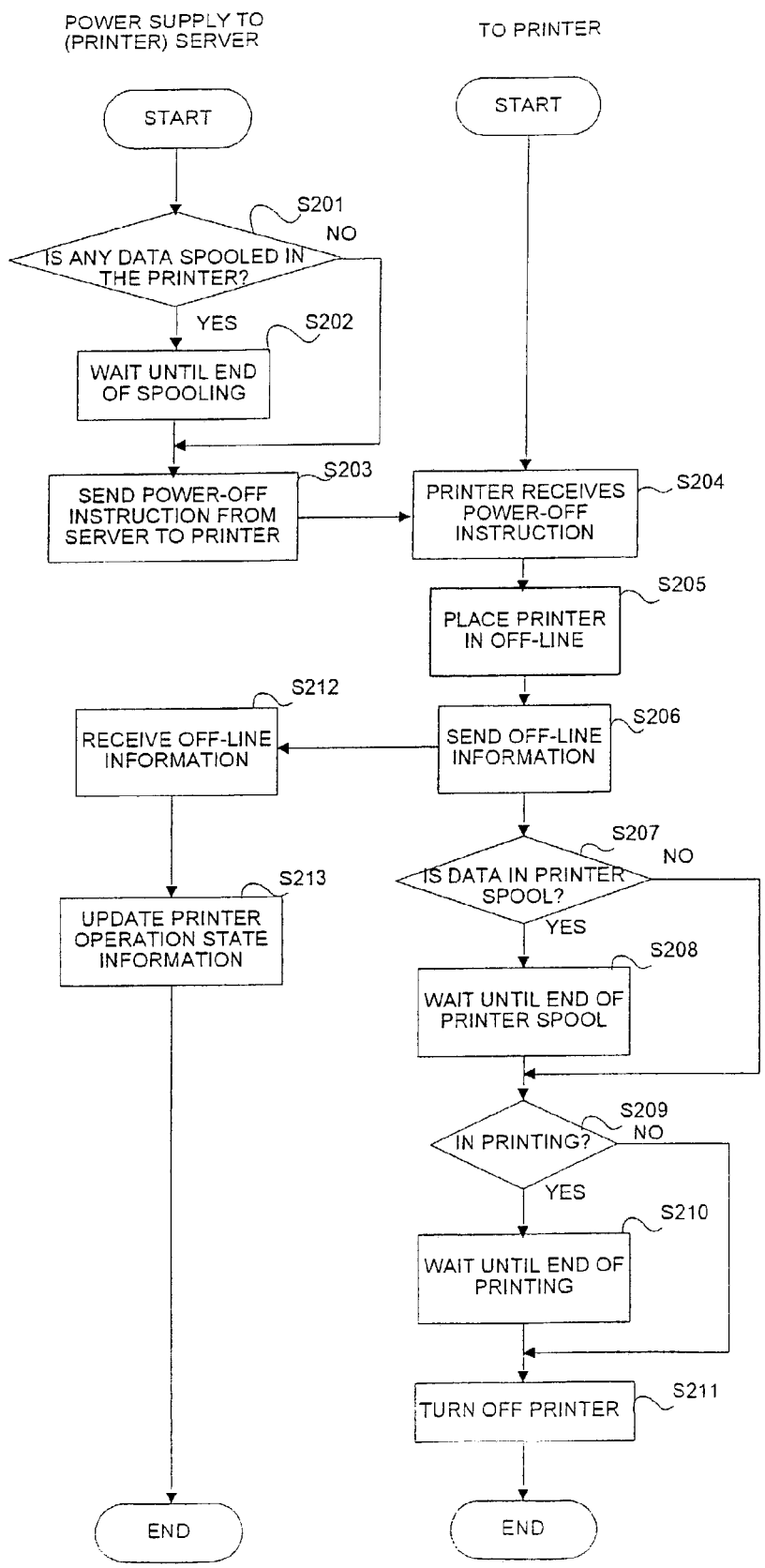
FIG. 3 is a flowchart of control in a power supply server and a printer in the printing system according to the first embodiment of the present invention.
Figure 4:
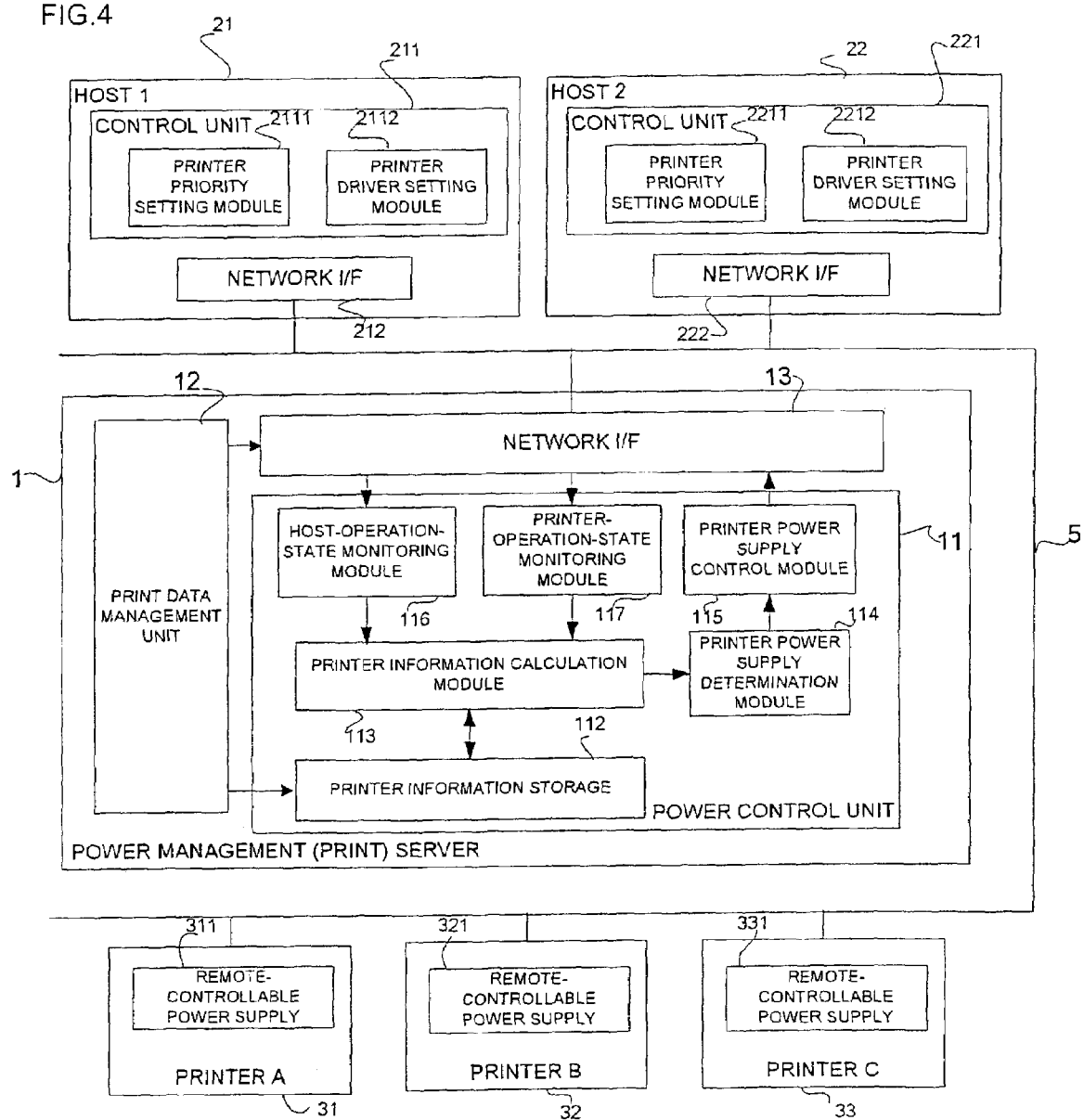
FIG. 4 is a block diagram showing a configuration of a printing system according to a second embodiment of the present invention.
Figure 5:
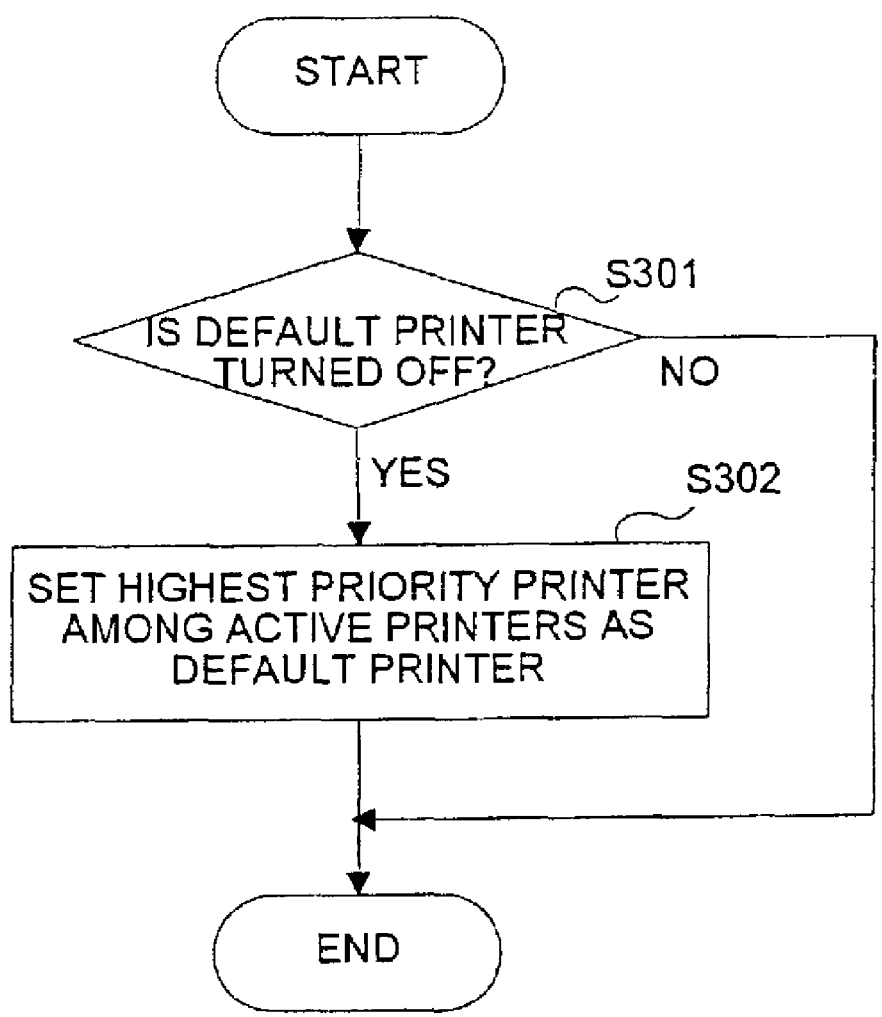
FIG. 5 is a flowchart of a control in a host in the printing system according to a second embodiment of the present invention.
Figure 6:
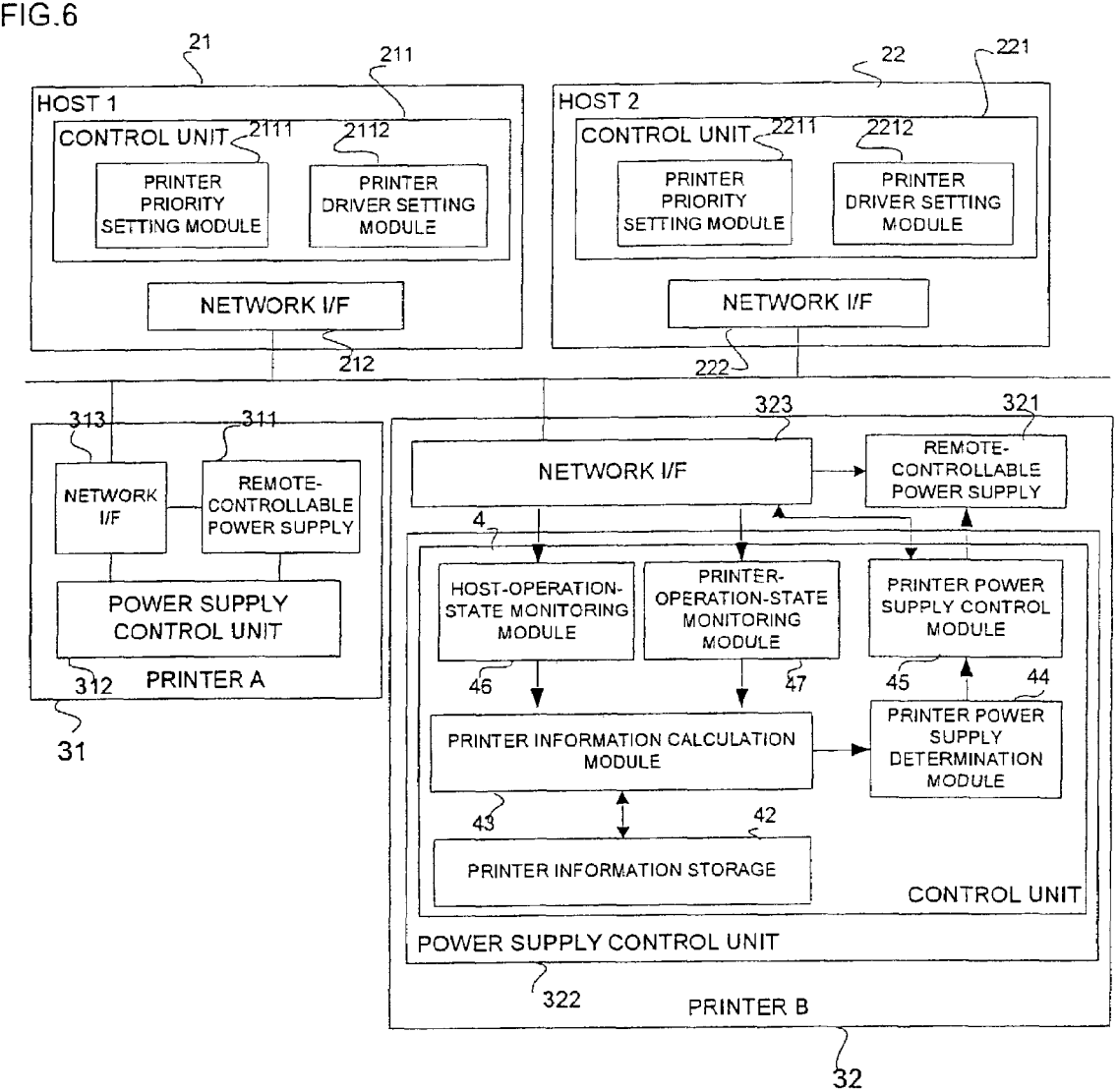
FIG. 6 is a block diagram showing a configuration of a printing system according to a third embodiment of the present invention.
Figure 7:
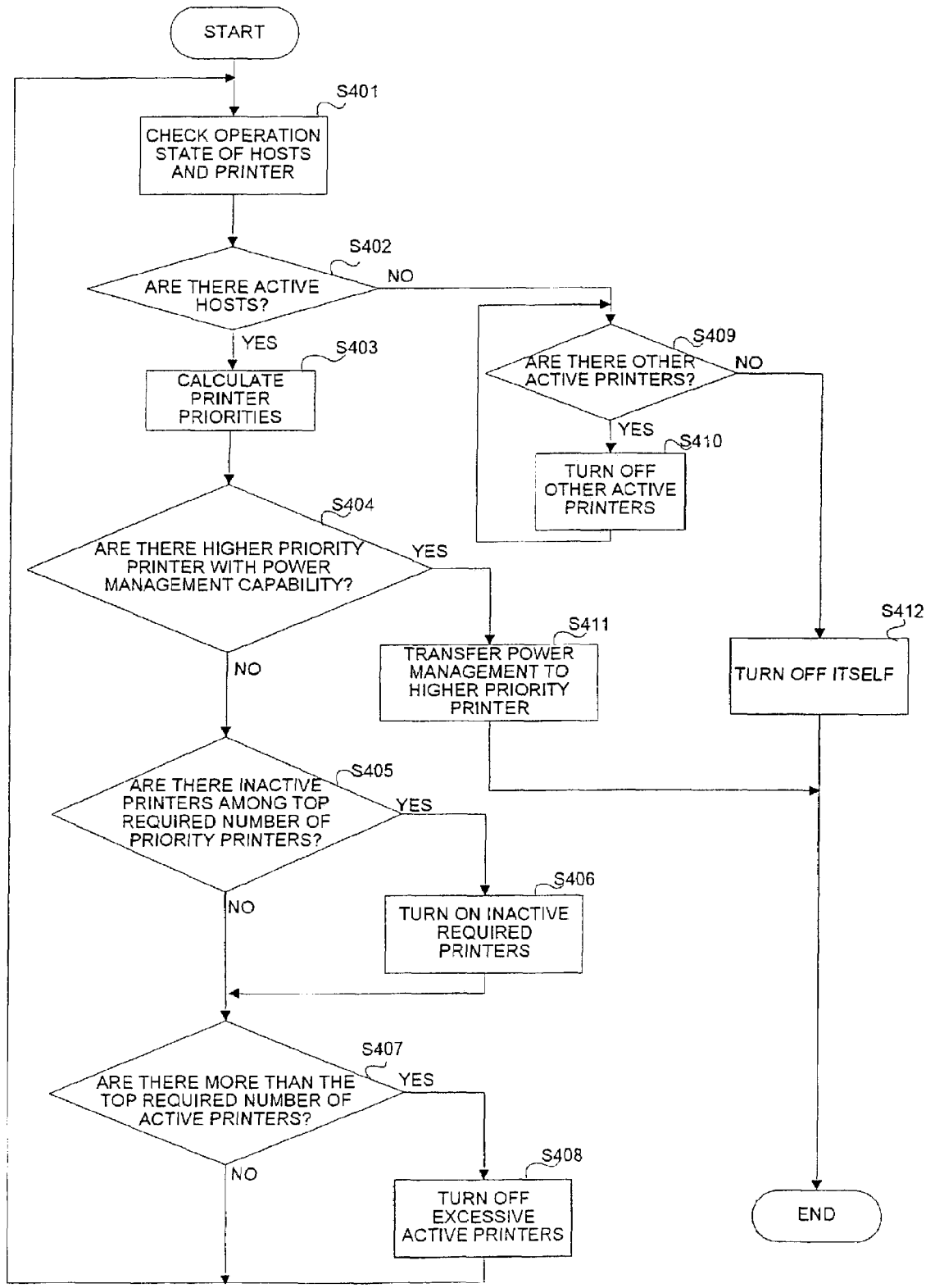
FIG. 7 is a flowchart of a control in a printer that is subjected to power management by the printing system according to the third embodiment of the present invention.

FIG. 1 is a block diagram showing a printing system according to a first embodiment of the present invention. FIG. 2 is a flowchart of control in a power management apparatus in the printing system according to the first embodiment of the present invention. FIG. 3 is a flowchart of control in a power supply server and a printer in the printing system according to the first embodiment of the present invention. FIG. 4 is a block diagram showing a configuration of a printing system according to a second embodiment of the present invention. FIG. 5 is a flowchart of control in a host in the printing system according to the second embodiment of the present invention. FIG. 6 is a block diagram showing a configuration of a printing system according to a third embodiment of the present invention. FIG. 7 is a flowchart of control in a printer that is subjected to power management by the printing system according to the third embodiment of the present invention. FIG. 8 illustrates an example of host-specific-priority-setting module data in the printing system according to the first embodiment of the present invention. FIG. 9 illustrates a first example of printer information calculation module data in the printing system according to the first embodiment of the present invention. FIG. 10 illustrates a second example of printer information calculation module data in the printing system according to the first embodiment of the present invention. FIG. 11 illustrates a third example of printer information calculation module data in the printing system according to the first embodiment of the present invention.

The first embodiment will be described. FIG. 1 shows a block diagram of a printing system configuration of the first embodiment of the present invention. In the first embodiment, a power management server (print server) 1, which is a power management apparatus, three printers 31 to 33, and three hosts 21 to 23 are connected to a network 5. The power management server 1 in FIG. 1 comprises a power control unit 11 for determining and controlling the power-on and power-off state of the printers 31 to 33, a network interface (I/F) 13 connected to the network 5 for sending and receiving data, and a print data management unit 12 for inputting and outputting print data. The power management server 1 is connected to the network 5 together with the hosts 21 to 23 which issue print requests and the printers 31 to 33 which receive the print requests from the hosts 21 to 23 and output print data.

The power control unit 11 includes a host-specific-priority-setting module 111, a printer information storage 112, a printer information calculation module 113, a printer power supply determination module 114, a printer power control module 115, a host-operation-state monitoring module 116, and a printer-operation-state monitoring module 117.

The printers 31, 32, 33 have remote-controllable power supplies 311, 321, and 331, respectively.

The host-operation-state monitoring module 116 sends specific packets such as ping to the hosts 21 to 23 at regular intervals under the control of a timer (not shown) provided in the power management server 1 and checks whether or not a response is sent back from the host 21 to 23 to determine whether or not they are powered on.

The method for monitoring whether or not operation of the hosts 21 to 23 ends is disclosed in Japanese Patent Laid-Open No 2000-172474 and therefore the detailed description of which will be omitted here.

The printer-operation-state monitoring module 117 has functions similar to those of the host-operation-state monitoring module 116. It checks a response from the printers 31 to 33 at regular intervals to determine whether the printers 31 to 33 are in the power-on state.

The host-specific-priority-setting module 111 stores priority settings for each of the hosts 21 to 23 as to the use of each printer 31 to 33.

The printer information calculation module 113 calculates the priority Pj of each of the printers 31 to 33 from priorities (necessity) of the printers 31 to 33 based on the host-specific priority settings and information about the operation state of the hosts 21 to 23 and the printers 31 to 33 that is obtained at the regular intervals.

The printer power supply determination module 114 includes memory (not shown) storing a predetermined reference value S for determining whether or not any of the printers 31 to 33 should be powered off and compares a priority Pj calculated by the printer information calculation module 113 with the reference value S.

An example of the method for priority calculation performed by the printer information calculation module will be provided below.

Let priorities assigned by n hosts to a certain printer j be $P_{j1}, P_{j2}, P_{j3}, \ldots, P_{jn}$. Let a variable $H_i$ be "1" if a host i is in the on-state and "0" if it is in the off-state. Then the priority $P_j$ of the printer j will be given by:

$$P_j = \sum_{i=1}^{N} (p_{ji} \times H_i) \qquad \text{[Formula 1]}$$

An example of a power management process performed in the power management apparatus in the printing system according to the first embodiment of the present invention will be described with reference to FIG. 2. The power management server 1 monitors through a host-operation-state monitoring module 116 and a printer-operation-state monitoring module 117 the power-on/off sate of the hosts 21 to 23 and the printers 31 to 33 on the network 5 at step S101 to whether any of the hosts are operating at step S102.

If none of the hosts are operating, then the printer power control module 115 turns off all the printers 31 to 33 at step S107 and the process will end.

On the other hand, if any of the hosts are operating, the printer-operation-state monitoring module 117 determines at step S103 whether more than one printer is operating.

If only one of the printers is operating, the printer should be left turned on until all the hosts 21 to 23 are turned off. Therefore, the process returns to step S101, where the host-operation-state monitoring module 116 monitors power to the hosts 21 to 23 at regular intervals.

On the other hand, if the printer-operation-state monitoring module 117 determines at step S103 that more than one printer is operating, then the printer information calculation module 113 calculates the priorities of the printers (Pj mentioned above) at step S104.

An example of host-specific-priority-settings is shown in FIG. 8. Assume that a host (1), (2), (3) can assign a total of 10 points to the printers (A), (B), and (C), and the printer storage 112 has not learned yet. FIG. 9 shows calculation results when all of hosts (1), (2), and (3) are in the on-state.

At step S105, the printer power supply determination means 114 determines whether there are printers whose value is below the reference value S that is set in the memory of the printer power supply determination module 114. Here, consider a case where the reference value S on which determination whether printers are turned on or off is based is set to <the number of active hosts+α>, where α=2.

If all the hosts 21 to 23 are active, then the reference value S is set to 5. If there is a printer whose total priority is less than or equal to 5, then the printer power supply determination module 114 determines that the degree of need of that printer is low and the printer power control module 115 turns off that printer by remote control at step S106.

In the example shown in FIG. 9, the results of calculation by the printer information calculation module 113 show that none of the printers (A), (B), and (C) has a total priority value less than or equal to 5. Consequently, the printer power supply determination means 114 determines that all the printers 31 to 33 are required. The process returns to step S101, where the host-operation-state monitoring module 116 and the printer-operation-state monitoring module 117 continue monitoring the operation state of the hosts and printers at regular intervals.

If any of the hosts sends no response packets back to the host-operation-state monitoring module 116, the host-operation-state monitoring module 116 determines that the host has been turned off and provides information indicating the same to the printer information calculation module 113. The printer information calculation module 113 re-calculates printer information from the information from the host-specific-priority-setting module 11 and the operation state of the hosts and provides the calculated priorities to the printer power supply determination module 114. The printer power supply determination module 114 calculates reference value S for turning on/off the printers from the information provided by the printer information calculation module 113 and compares the reference value S with each priority. If the number of active hosts is two, the reference value S is set to 4<the number of the active hosts, 2, +2>.

If the host operation-state monitoring module 116 receives no response packet from host 1, then it determines that host (1) is turned off and the result of calculation by the printer information calculation module 113 shows that the priority of printer (A) is 3, as shown in FIG. 10(a), (b). It is determined that printer (A) is not required because the reference value S set by the printer power supply determination module 114 is 4. The printer power control module 115 turns off the printer (A) by remote control at step S106. Then the process returns to step S101, where the host-operation-state monitoring module 116 and the printer-operation-state monitoring module 117 continue monitoring the operation state of the hosts and the printers.

Likewise, when the host (3) is turned off as shown in FIG. 11, the priority of the printer (C) becomes 3 and the printer (C) is turned off because it is less than the reference value S of 4.

Now, consider a case where a large number of hosts are connected. When the number of the hosts are large, the priority totals can balance and no printer is turned off on the basis of the above-described reference value S<the number of hosts +α>. In that case, the ratio between the number of hosts and the number of printers, for example, may be set as the reference value S for turning on/off printers. When the ratio of the number of printer to the number of the hosts exceeds this setting, the printer with the lowest priority may be turned off.

Alternatively, the number of required printers and the number of required hosts may be preset in a table and when the number of active hosts becomes less than the number of the hosts in the table, the printer with the lowest priority may be turned off.

The priorities of the hosts can possibly be ignored when a printer is turned off on the basis of the criteria described above. The power management server has a timer function, which is not shown. Therefore, determination whether printers should be turned off can be made at the time of day at which the most of the hosts end their operation, thereby improving the usability of the system.

Conversely, when the number of active hosts increases and accordingly the priority of a printer in the power-off state exceeds the reference value S for determining power on/off, then the power management server may send an activation instruction to that printer.

Furthermore, states in which the hosts used the printers are stored in the printer information storage. It is preferable that the power management server 1 also serves as a print server.

The print data management unit 12 receives a print request sent from the hosts 21 to 23 and sends print data to the requested printer 31 to 33 over the network 5 and stores in the printer information storage 112 information about the host for which the data has been printed.

The printer information storage 112 can store the name of a printer to which each host 21 to 23 has actually outputted data and the time and date when the host 21 to 23 has provided the output so that the information is reflected in values set by the host-specific-priority-setting module 111.

For example, host (1) has assigned priorities 3 for printer (A), 5 for printer (B), and 2 for printer (C), as shown in FIG. 8. However, printing can possibly be performed with usage 5 for printer (A), 4 for printer (B), and 1 for printer (C), which are different from the priorities preset on the basis of predictions.

Records of printing performed for each host 21 to 23 can be stored in and taught to the printer information storage 112 so that the optimum host-specific-priority-settings can be automatically redefined according to the real usage.

Furthermore, printing request characteristics of each host 21 to 23 such as the frequency, day of week, and time at which the host request printing can be taken into account to keep an optimum printer 31 to 33 for real use turned on.

FIG. 3 is a flowchart of a process for turning off printers, which corresponds to step S106 in FIG. 2.

Steps S201 to S203, and steps S212 and S213 are performed in the power management server and steps S204 to S211 are performed in printers.

When the printer power supply determination module 114 has determined a printer whose priority is less than a set reference value S, it checks the print data management unit 12 to see whether or not the printer has accepted a data output request to the printer at step S201.

If the printer has accepted no data, the printer power control module 115 sends a power-off instruction to the printer at step S203.

On the other hand, if the printer has accepted data, all of the data is spooled at step S202 and then the process proceeds to step S203.

The printer receives the power-off signal at step S204 and enters off-line state at step S205, then sends off-line information to the power management server 1 at step S206.

The power management server 1 receives the off-line state from the printer at step S212, then updates information in the printer-operation-state monitoring module 117 at step S213.

The printer which has sent the off-line instruction checks whether it is spooling data at step S207. If it is not spooling data, then the process proceeds to step S209. If it is spooling data, then the process waits for the completion of the spooling of all data at step S208 and proceeds to step S209.

At step S209, the printer checks whether it is printing any data. If it is printing no data, the process proceeds to step S211, where the printer is turned off. On the other hand, if it is printing data, at step S210 the process waits until the completion of the printing of all data, then the printer is turned off at step S211.

The process flow shown in FIG. 3 is for printing performed via a print server. If no print server is used, steps S201 and S202 are not necessary. The steps subsequent to step S202 are performed by the printer power control module and the printer in a similar manner. In that case, the printer power-off instruction at step S203 is directly sent from the power control unit 11 to the printer through the network I/F 13.

Power saving can be effectively achieved because power supply to the printers can be controlled according to the operation state of the hosts at any given time, as described above.

A second embodiment of the present invention will be described below. FIG. 4 shows a printing system in which printer prioritization modules 2111, 2211, which are contained in the power control unit in FIG. 1, are provided in the hosts 21, 22 so that the hosts can set printer priorities. The hosts 21, 22 have control units 211, 221 comprising the printer prioritization modules 2111, 2211 and printer driver setting modules 2112, 2212 for storing printer driver settings. A power management server 1 monitors the power-on/off state of the hosts 21, 22 thorough a host-operation-state monitoring module 116 and obtains information about printer priority settings.

The hosts 21, 22 have network I/F 212, 222.

Other components and functions of the system are the same as those in the first embodiment.

The printer prioritization module 2111, 2211 may send information about the priority of printers 31 to 33 to the power management server 1 upon powering up the hosts or after updating the information in the printer prioritization module 2111, 2211.

The priority settings of the printers 31 to 33 can be updated on a user-by-user basis and the updates can be reflected in the settings on the power management server 1 without the need for changing the settings on the power management server 1 because each host 21, 22 can set them.

When the power management server 1 receives off-line information from a printer 31 to 33 or receives no response to packets it sends to each printer 31 to 33 at regular intervals, it may update printer operation information and send information indicating the power-off state of that printer (or information about printers that are currently in the power-on state) to the hosts 21, 22.

This arrangement allows the host 21, 22 to set the printer with the highest priority for that host among active printers as its default printer.

FIG. 5 is a flowchart of an example of a process performed by a host that receives information indicating the power-off of a printer.

At step S301, the host checks whether its default printer is in the power on or off state. If the printer is in the power-off state, the host automatically sets the next highest priority printer as its default printer at step S302.

For example, if priorities are set as shown in FIG. 8 and printer (B) is turned off, then host (1) and host (2) set printer (A), which has the next highest priority, as their default printer.

As described earlier, the priorities can be set on and stored in the hosts so that the printer priorities can be readily changed on a host-by-host basis. Furthermore, the printer driver to use can be automatically changed, thereby improving the usability of the system.

A third embodiment of the present invention will be described below. A configuration can be provided in which at least one printer 32 of a plurality of printers 31, 32 includes a power control unit 322 and no power management server is provided, as shown in FIG. 6.

The printer 31 includes a remote-controllable power supply 311, a power supply control unit 312, and a network I/F 313.

The printer 32 includes a remote-controllable power supply 321 and a network I/F 323.

The components and functions of the power control unit 322 are exactly the same as those in the second embodiment. The power control unit 322 has a controller 4 comprising a printer information storage 42, a printer information calculation module 43, a printer power supply determination module 44, a printer power control module 45, a host-operation-state monitoring module 46, and a printer-operation-state monitoring module 47.

When each printer including the power control unit 322 is turned on, it checks whether or not the hosts and the other printers are in the power-on state and calculates printer information.

A printer power control module 45 of the printer evaluates the results of the calculation. The printer that is found to be the highest-priority printer functions as the power management server in the second embodiment shown in FIG. 4.

In a state shown in FIG. 9 in which three hosts (1), (2), and (3) and the three printers (A), (B), and (C) are active, printer (B) assumes power management and the other printers do not perform power management but functions as ordinary printers.

When host (1) is turned off as shown in FIG. 10, printer (C) becomes the printer with the highest priority. When host (1) is turned off, printer (B) recalculates priorities. In this example, it determines that printer (C) has the highest priority on the basis of determination by the printer power supply determination modules and communicates the determination to printer C through the printer power control module. Then, printer (C) assumes power management.

After communicating the determination, printer (B) functions as an ordinary printer.

FIG. 7 shows a flowchart of a process performed by the printer responsible for power management. This flowchart also shows a flow of process in which the number of printers that is proportional to the number of active hosts is obtained from the ratio between them or a table as described with respect to the first embodiment and then printers having low priorities with respect to the obtained number of printers are turned off.

At step S401, the host-operation-state monitoring module 46 and the printer-operation-state monitoring module 47 send packets to monitor the power on/off state of the hosts 21, 22 and the printers 31, 32 on the network 5.

At step S402, it is determined whether or not there are active hosts. If no hosts are active, it is determined whether or not there is another active printer at step S409.

If there is another active printer, the printer power control module 45 turns off the remote-controllable power supply of the printers at step S410. Then the process returns to step S409.

Steps S409 and S410 are repeated until all of the other printers are turned off.

If there are no other active printers at step S409, the printer power control module 45 shuts off power to itself at step S412.

On the other hand, if it is determined at step S402 that there are active hosts, the printer information calculation module 43 calculates the priorities of the printers at step S403.

If the printer power supply determination module 44 determines at step S404 that there is a printer having a power management capability and a higher priority than that of the printer responsible for power management, the printer responsible for power management transfers power management to the printer with the higher priority through the network I/F323 at step S411 and thus ends its power management process.

On the other hand, if it is determined at step S404 that the printer has the highest priority, the printer power supply determination module 44 checks whether or not there are inactive printers among the top required number of priority printers at step S405.

If all of the required number of priority printers is in the power-on state, the process proceeds to step S407. On the other hand, if there are printers among the top required number of priority printers that are in the power-off state, those printers are turned on at step S406 and then the process proceeds to step S407.

If the printer power supply determination module 44 determines at step S407 that more than the top required number of priority printers are in the power-on state, the excessive, lower priority printers are turned off at step S408, and then the process returns to step S401.

On the other hand, if it is determined that there is no excessive printers at step S407, the process immediately returns to step S401 and above described steps are repeated.

As described above, the printer that has the highest priority assumes power management at a given point of time and thus power management of the printers on the network can be provided until the last active host is turned off, without the provision of a power management (print) server.

Embodiments of a power management apparatus, a file server, and a printing system according of the present invention will be described with reference to FIGS. 12 to 22.

Figure 12:
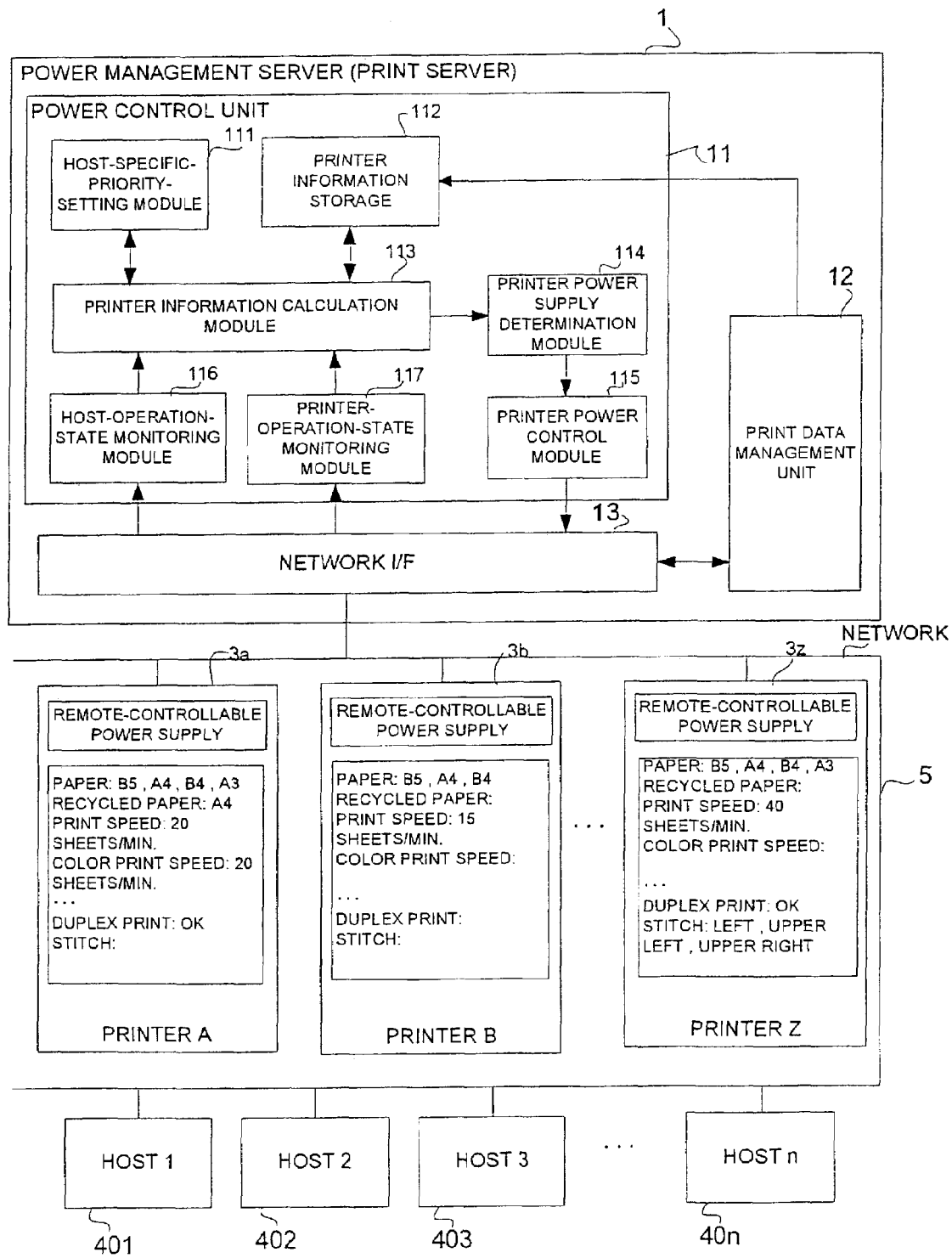
FIG. 12 is a block diagram showing a configuration of a printing system according to the fourth embodiment of the present invention.
Figure 13:
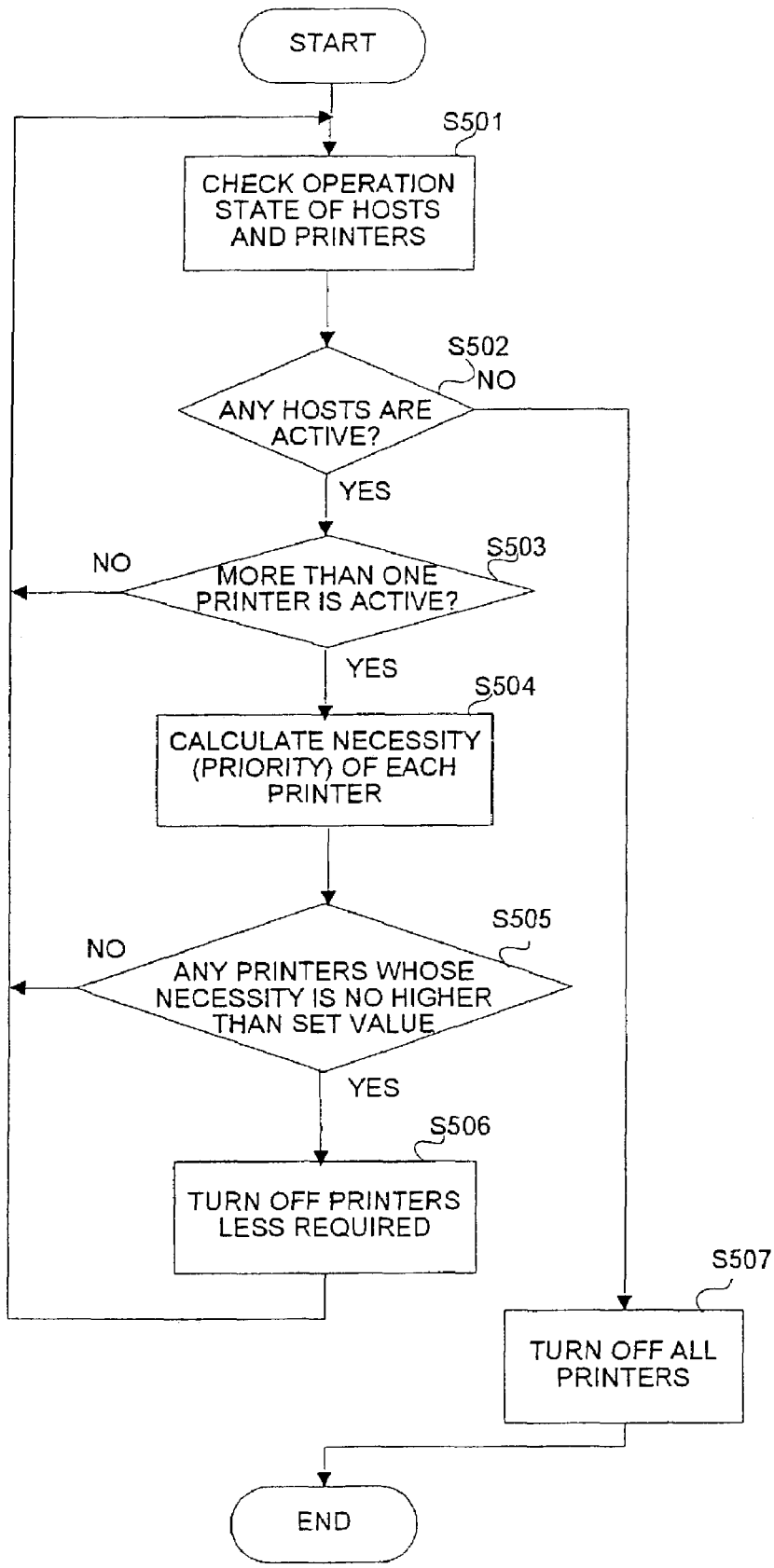
FIG. 13 is a flowchart of control in a power management apparatus in the printing system according to the fourth embodiment of the present invention.
Figure 18:
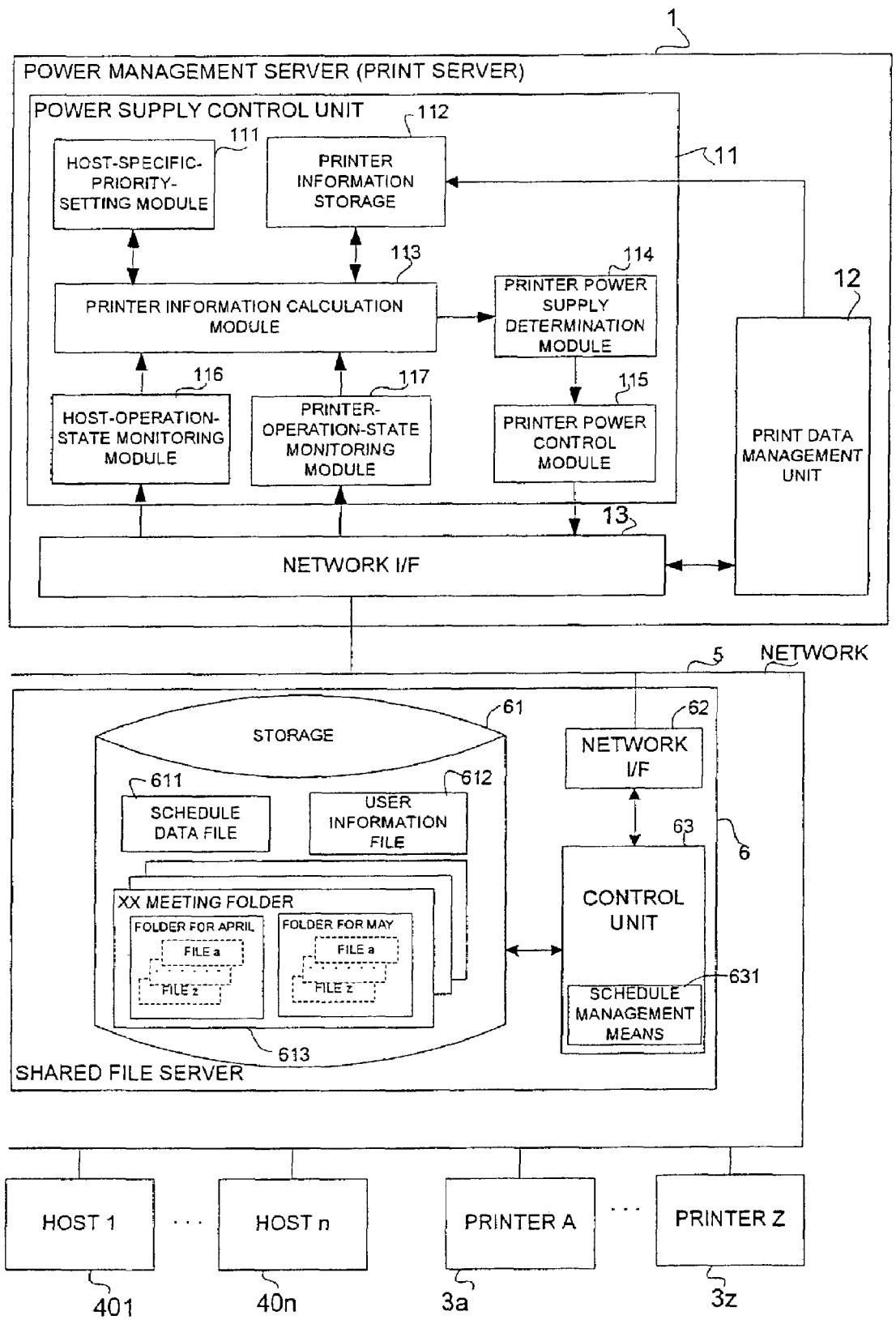
FIG. 18 is a block diagram showing a configuration of a printing system according to a fifth embodiment of the present invention.
Figures 21, 22:
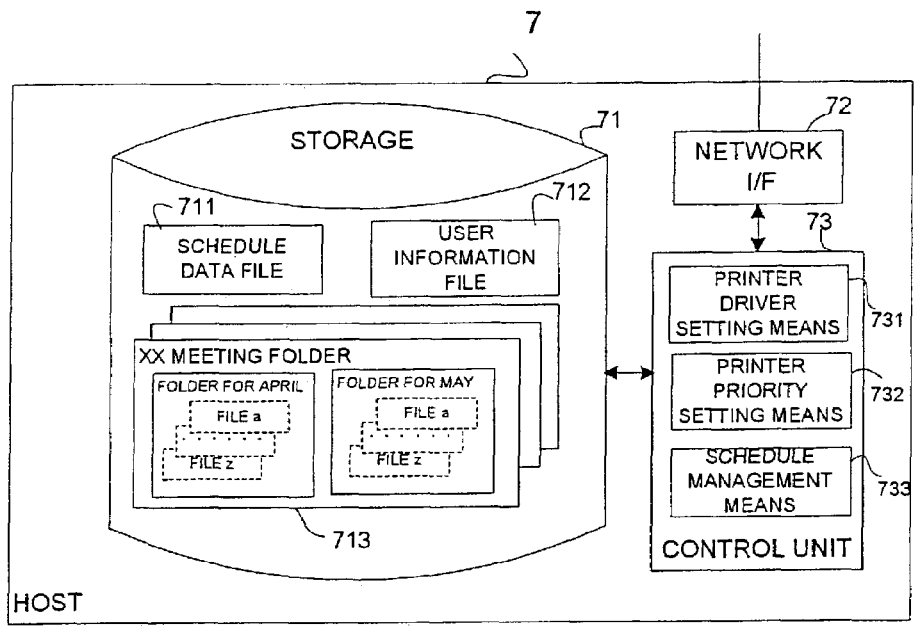
FIG. 21 shows a variation of a host in the printing system according to the fifth embodiment of the present invention.
FIG. 22 shows another example of the schedule data file in the printing system according to the fifth embodiment of the present invention.

FIG. 12 is a block diagram showing a configuration of a printing system according to a fourth embodiment of the present invention. FIG. 13 is a flowchart of control in a power management apparatus in the printing system according to the fourth embodiment of the present invention. FIG. 14 illustrates an example of point assignment by a host-specific-priority-setting module in the printing system according to the fourth embodiment of the present invention. FIG. 15 illustrates a first example of results of calculation by a printer information calculation module in the printing system according to the fourth embodiment of the present invention. FIG. 16 illustrates a second example of results of calculation by the printer information calculation module in the printing system according to the fourth embodiment of the present invention. FIG. 17 illustrates a third example of results of calculation by the printer information calculation module in the printing system according to the fourth embodiment of the present invention. FIG. 18 is a block diagram showing a configuration of a printing system according to a fifth embodiment of the present invention. FIG. 19 illustrates an example of a schedule data file in the printing system according to the fifth embodiment of the present invention. FIG. 20 illustrates an example of host-specific-priority-setting module data in the printing system according to the fifth embodiment of the present invention. FIG. 21 shows a variation of a host in the printing system according to the fifth embodiment of the present invention. FIG. 22 shows another example of the schedule data file in the printing system according to the fifth embodiment of the present invention.

The fourth embodiment will be described below. The printing system according to the fourth embodiments comprises a power management server (print server) 1, which is a power management apparatus, z printers $3a$ to $3z$, and n hosts 401 to $40n$, all of which are interconnected through a network 5.

The power management server 1 comprises a power control unit 11 for determining and controlling the power-on/off of the printers $3a$ to $3z$, a network I/F 13 connected to the network 5 for sending and receiving data, and a print data management unit 12 for inputting and outputting print data. The power management server 1 is connected to the network 5 together with the hosts 401 to $40n$ which request printing and the printers $3a$ to $3z$ which receive print requests from the hosts 401 to $40n$.

The power control unit 11 includes a host-specific-priority-setting module 111, a printer information storage 112, a printer information calculation module 113, a printer power supply determination module 114, a printer power supply control module 115, a host-operation-state monitoring module 116, and a printer-operation-state monitoring module 117.

The host-operation-state monitoring module 116 sends a specific packet such as ping to the hosts 401 to $40n$ at regular intervals under the control of a timer (not shown) provided in the power management server 1 and checks whether or not a response is sent back from the host 401 to $40n$ to determine whether or not they are powered on. (An example of the method for monitoring whether or not operation of the hosts 401 to $40n$ has ended is disclosed in Japanese Patent Laid-Open No 2000-172474.)

The printer-operation-state monitoring module 117 has functions similar to those of the host-operation-state monitoring module 116. It checks a response from the printers $3a$ to $3z$ at regular intervals to determine whether the printers $3a$ to $3z$ are in the power-on state.

The host-specific-priority-setting module 111 stores priority settings for each of the hosts 401 to $40n$ as to the use of each printer $3a$ to $3z$ and also stores priority settings for the functions (performance) of the printers $3a$ to $3z$.

The printer information calculation module 113 calculates the priority P of the printers $3a$ to $3z$ at a given point of time from priorities of the printers $3a$ to $3z$ based on the host-specific priority settings and information about the operation state of the hosts 401 to $40n$ and the printers $3a$ to $3z$ that is obtained at the regular intervals.

The printer power supply determination module 114 includes memory (not shown) storing a predetermined reference value S for determining whether or not any of the printers $3a$ to $3z$ should be powered off and compares a priority P calculated by the printer information calculation module 113 with the reference value S An example of a power management process performed in the power management apparatus in the printing system according to the fourth embodiment of the present invention will be described with reference to FIG. 13. The power management server 1 monitors the power-on/off sate of the hosts 401 to $40n$ and the printers $3a$ to $3z$ on the network 5 at step S501 and determines whether any of the hosts are operating at step S502.

If none of the hosts are operating, then the printer power control module 115 turns off all the printers $3a$ to $3z$ at step S507 and the process will end.

On the other hand, if any of the hosts are operating, the printer-operation-state monitoring module 117 determines at step S503 whether more than one printers are operating.

If only one of the printers is operating, the printer should be left turned on until all the hosts 401 to $40n$ are turned off. Therefore, the process returns to step S501, where the host-operation-state monitoring module 116 monitors power to the hosts 401 to $40n$ at regular intervals.

On the other hand, if the printer-operation-state monitoring module 117 determines at step S503 that more than one printers are operating, then the printer information calculation module 113 calculates the priorities P of the printers $3a$ to $3z$ at step S504.

An example of calculation of host-specific priorities will be described below. Assume that each of hosts (1) to (n) can assign a total of 10 points to printers (A) to (Z) and each of functions (size A3 print, recycled paper print, color print, . . . , duplex print). (In this example, assume that one point assigned to each point (A) to (Z) is equivalent to a value of 1, one point assigned to the color print function is equivalent to a value of 3, and one point assigned to the duplex print function is equivalent to a value of 2. The values assigned to each function are assigned to the printer having that function.) Assume that the hosts (1) to (n) have assigned points to the printers (A) to (Z) and their functions in the host-specific-priority setting module 111 as shown in FIG. 14.

When power supply to the hosts (1) to (n) is set as shown in FIG. 15(a), calculated priorities P of the printers (A) to (Z) will be as shown in FIG. 15(b).

At step S505, the printer power supply determination module 114 determines whether or not there are printers whose total priority P value calculated by the printer information calculation module 113 is less than the reference value S in the memory of the printer power supply determination module 114. Here, assume that the reference value S for turning on/off a printer is set to 3. If there is a printer whose total priority value is less than or equal to 3, the printer power supply determination module 114 determines that the degree of need for the printer is low and the printer power control module 115 turns off the printer by remote control at step S506.

In the case shown in FIG. 15(a), calculation by the printer information aggregation module 113 shows that there are no printers (A) to (Z) whose priority value is less than or equal to 3. Therefore the printer power supply determination module 114 determines that all of the printers 3a to 3z are required. The process returns to step S501 and the host-operation-state monitoring module 116 and the printer-operation-state monitoring module 117 continue monitoring the operation state of the hosts and printers at regular intervals.

If any of the host sends back no response packet to the host-operation-state monitoring module 116, the host-operation-state monitoring module 116 determines that the host has been turned off and provides information indicating it to the printer information calculation module 113. The printer information calculation module 113 re-calculates printer information from information provided from the host-specific-priority-setting module 111 and the operation state of the hosts and provides the calculated priorities to the printer power supply determination module 114. The printer power supply determination module 114 calculates priorities from the information provided from the printer information calculation module 113 and compares the results with the reference value S for determining the printer-on/off state of the printers.

If the host-operation-state monitoring module 116 receives no response packet from the host (1), it determines that the host has been turned off as shown in FIG. 16(a) and the result of the calculation by the printer information calculation module 113 will provide a priority value 3 for printer (A) as shown in FIG. 16(b). Consequently, it is determined that printer (A) is not required because the reference value S set in the printer power supply determination module 114 is 3. The printer power control module 115 turns off printer (A) by remote control at step S506. Then the process returns to step S501 and the host-operation-state monitoring module 116 and the printer-operation-state monitoring module 117 continue monitoring the operation state of the hosts and the printers.

Likewise, when host (3) is turned off as shown in FIG. 17(a), the priority value of for the printer C becomes 3 as shown in FIG. 17(b). Because this priority value is equal to the reference value S, 3, printer (C) will be turned off.

The print management module 12 receives a print request issued from a host 401 to 40n over the network 5, sends print data to a requested printer 3a to 3z, and stores information about the host for which the printing has been performed in the printer information storage.

In the configuration described above, users can set priorities and functions (performance) of the printers 3a to 3z for each of the hosts 401 to 40n on the host-specific-priority-setting module 111 to specify those printers to be left powered on that have functions (performance) required for their jobs.

The fifth embodiment of the present invention will be described below. In the fifth embodiment, a shared file server 6 is connected to the power management server in the fourth embodiment over the network 5.

The shared file server 6 comprises a storage 61 for storing a schedule data file 611, a user information file 612, and a meeting folder 613, a control unit 63 which is connected to the storage 61 and includes schedule management means 631, and a network I/F 62 for sending and receiving data, as shown in FIG. 18.

Stored in the schedule data file 611 is schedule data including the start and end dates and times of an event such as a meeting and a handout used in the event (or the location in which the handout is stored) written by users through hosts 401 to 40n connected to the network 5, as shown in FIG. 19(a).

The schedule data file 611 can be read through the hosts 401 to 40n. The users perform their jobs with reference to the schedule data.

The handout used in the event is an event handout file that can store a user ID and printer functions specified as print conditions as shown in FIG. 19(b). In the event handout file, the dates and times of creation and update of the handout are automatically set.

The user information file 612 stores data indicating the hosts associated with user IDs as shown in FIG. 19(c).

The schedule management means 631 of the control unit 63 identifies the hosts that give high priority to the printer functions specified as print conditions in the event handout file, from the user information file 612 on the basis of the user ID in the handout file.

It then converts the specified printer functions into printer function priorities for the identified host and reports the converted priorities to the host-specific-priority-setting module 111 in the power management server 1 prior to the start data and time of the event written in the schedule data file 611.

In this way, the printer functions specified as printer conditions are reported to the host-specific-priority setting module 111 as priorities so that printers having the functions required for the user's jobs can be automatically turned on prior to the start date and time of the event written in the schedule data file 611.

Consider a case in which a user prepares a handout for a meeting in the printing system having the configuration described above. A user ID and print conditions of the handout is set for the handout created by the user. Duplex printing and use of recycled paper are specified as printing conditions. Then, the user writes the name of the meeting, place, start date and time, and end date and time of the meeting in the schedule data. The user also writes the storage location of the handout.

The priority values for printers for the host are normally set in the host-specific-priority-setting module 111 as shown in FIG. 20(a). The day before the meeting, the priority values of the recycled paper and duplex printing are changed by the schedule management means 631 as shown FIG. 20(b) so that the printer capable of recycled paper, duplex printing is automatically turned on.

The schedule management means may be configured so as to provides notification to the host-specific-priority-setting module 111 in the power management server 1 after the predetermined end date and time of the event to cause it to restore the priority settings to the previous state. This configuration allows the printer priority settings to be automatically restored to its normal state after printing of the handout used in the event becomes unnecessary.

A variation of the fifth embodiment will be described below. In a printing system in this variation, printer driver setting means 731, printer priority setting means 732 and schedule management means 733 are provided in a control unit 73 in each host 7, as shown in FIG. 21 so that a power management server 1 is controlled on the basis of a schedule data file 711 in the host 7.

The host 7 comprises a storage 71 storing the schedule data file 711, a user information file 712, and a meeting folder 713, a control unit 73 which is connected to the storage 71 and includes the printer driver setting means 731, printer priority setting means 732, and schedule management means 733, and a network I/F 72 for sending and receiving data, as shown in FIG. 21.

In an alternative example, event-handout distribution date and time may be written in the schedule data file 711 as shown in FIG. 22 so that a host-specific-priority-setting module 111 in the power management server 1 can receive notification on the basis of the handout distribution data and time.

In that case, printer functions specified as print conditions can be notified to the host-specific-priority-setting module 111 as priorities before the event handout distribution date and time so that the printer is not affected by the start date and time of the event specified in the schedule data file 711 if a user wants to distribute the handout prior to the event.

While the embodiments have been described with respect to a print system and power management apparatus, computer software or a computer-readable recording medium (for example a CD-ROM) containing a program for causing a computer to implement the functions of the printer power supply control module in the power management apparatus can be used.

According to the present invention, a power management apparatus, printers, and a printer system can be provided that improve the usability of the printers and provide energy saving effects by activating a printer that is likely to be required by a host such as a computer having power supplied to it or activating printers proportional in number to the number of hosts having power supplied to them.

Furthermore, according to the present invention, a power management apparatus, a file server, and a printing system can be provided that allow, in addition to (or instead of) the printer priorities for each host, printer functions (performance) required by the host to be specified as data for determining power management of a plurality of printers shared among a plurality of hosts and also allow required functions (performance) associated with a specific job set in a schedule to be automatically and temporarily set as data for determining power management.

What is claimed is:

1. A power management apparatus for managing power supply to a plurality of printers connected to a plurality of hosts over a network, said power management apparatus comprising:
   a host-operation-state monitoring module for monitoring whether or not said hosts are powered on;
   a host-specific-priority-setting module for setting priority of each of said printers for each of said hosts;
   a printer information calculation module for aggregating the set host-specific priorities to calculate priority of each of said printers based at least in part on whether the host-operation-state monitoring module monitors that one or more of said hosts is powered on;
   a printer power supply determination module for determining whether or not each printer should be powered on based at least in part on the calculated priority of each of said printers; and
   a printer power supply control module for remotely controlling power supply to each printer on the basis of determination of whether or not the printer should be powered on.

2. The power management apparatus according to claim 1, wherein said printer power supply determination module determines that a printer need not be powered on if the calculated priority of the printer is lower than either a preset printer priority or an active-host-count-based priority determined by the number of powered-on hosts.

3. The power management apparatus according to claim 1, wherein said printer power supply determination module determines that a number of top-priority printers should be powered on and that the other lower-priority printers need not be powered on, said number of top-priority printers to be powered on being determined by taking the number of powered-on hosts into account.

4. A printing system comprising the power management apparatus according to claim 1, a plurality of hosts and a plurality of printers.

5. The printing system according to claim 4, wherein each of the hosts includes a printer priority setting module for setting priorities of each of the printers for the host.

6. The printing system according to claim 4, wherein a printer having a power management apparatus or power management control capability has the capability of notifying the hosts that the printer is wined off, and said hosts have the capability of receiving the notification and determining whether or not a printer set by the hosts as a default printer is turned off and the capability of changing the default printer to the printer for which the highest priority is set among printers being powered on.

7. The printing system according to claim 4, wherein a printer to be tuned off because said printer is of low priority and less necessity is turned off after the end of spooling if said printer is spooling print data or after the completion of printing if said printer is in printing.

8. The power management apparatus according to claim 1, further comprising a print data management module for mediating print data sent from each host to each printer and a printer information storage for storing information about the amount of print data sent from each host to each printer, wherein said printer information calculation module calculates the information about the amount of the print data and reflects the result of the calculation in the setting of the host-specific priority.

9. A printer that has power management capability and is connected to a plurality of hosts and one or more printers over a network, said printer comprising:
   a host-operation-state monitoring module for monitoring whether or not said hosts are powered on;
   a host-specific-priority-setting module for setting priorities for each of said printers for each of said hosts;
   a printer information calculation module for aggregating the set host-specific priorities to calculate priority of each of said printers based at least in part on whether the host-operation state monitoring module monitors that one or more of the hosts is powered on;

a printer power supply determination module for determining whether or not each printer should be powered on based at least in part on the calculated priority of each of said printers; and a printer power supply control module for remotely controlling power supply to each printer on the basis of determination of whether or not the printer should be powered on.

10. The printer according to claim 9, wherein said printer power supply determination module determines that a printer need not be powered on if the calculated priority of the printer is lower than a preset printer priority or an active-host-count-based priority determined by the number of powered-on hosts.

11. The printer according to claim 9, wherein said printer power supply determination module determines that a number of top-priority printers should be activated and that the other lower-priority printers need not be activated, said number of top-priority printers to be activated being determined by taking the number of powered-on hosts into account.

12. A printing system comprising a plurality of hosts connected via a network to a plurality of printers, including the printer having power management capability according to claim 9, wherein a control unit in a printer determined as being the most required printer performs power management for the plurality of printers interconnected over a network.

13. The printing system according to claim 12, wherein each of the hosts includes a printer priority setting module for setting priorities of each of the printers for the host.

14. The printing system according to claim 12, wherein a printer having a power management apparatus or power management control capability has the capability of notifying the hosts that the printer is turned off, and said hosts have the capability of receiving the notification and determining whether or not a printer set by the hosts as a default printer is turned off and the capability of changing the default printer to the printer for which the highest priority is set among printers being powered on.

15. The printing system according to claim 12, wherein a printer to be turned off because said printer is of low priority and less necessity is turned off after the end of spooling if said printer is spooling print data or after the completion of printing if said printer is in printing.

16. A power management apparatus for managing through a network power supply to a plurality of printers connected to a plurality of hosts over the network, said power management apparatus comprising:

a host-operation-state monitoring module for monitoring whether or not said hosts are powered on;

a host-specific-priority-setting module for setting priority of each of said printers and priority of a function of said each printer for each of said hosts;

a printer information calculation module for aggregating the set host-specific priorities to calculate priority of each of said printers based at least in part on whether the host-operation state monitoring module monitors that one more of the hosts is powered on;

a printer power supply determination module for determining whether or not each printer should be activated based at least in part on the calculated priority of each of said printers; and a printer power supply control module for remotely controlling power supply to each printer on the basis of determination of whether or not the printer should be activated.

17. The power management apparatus according to claim 16, wherein said host-specific-priority setting module sets the priority of each printer and the priority of the function of said each printer for each host by using points owned by said each host, said points used for setting the priority of said each printer having a rate (weight) different from that of said points used for setting the priority of the fraction of said printer.

18. A file server connected to the power management apparatus according to claim 17 over said network, said file server comprising:

schedule management means for converting a specified printer function into the priority of the printer function for a host on the basis of a schedule data file with which an event handout file capable of storing information about a user and a printer function specified as a printing condition and an event start date and time are associated and a user information file storing information associating with the host, and for indicating the converted priority to the host-specific-priority setting module of the power management apparatus prior to the event start date and time.

19. A file server connected to the power management apparatus according to claim 16 over said network; said file server comprising:

schedule management means for converting a specified printer function into the priority of the printer function for a host on the basis of a schedule data file with which an event handout file capable of storing information about a user and a printer function specified as a printing condition and an event start date and time are associated and a user information file storing information associating with the host, and for reporting the converted priority to the host-specific-priority setting module of the power management apparatus prior to the event start date and time.

20. The file server according to claim 19, wherein said schedule management means indicates the host-specific-priority setting module of the power management apparatus to reset the priority to a preset priority in a predetermined time after an event end date and time if the event end date and dine is further associated with the schedule data file.

21. The file server according to claim 19, wherein said schedule management means indicates the priority to the host-specific-priority setting module of the power management apparatus on the basis of a handout distribution date and time instead of the event start date and time if the event handout distribution date and time is associated with the schedule data file.

22. A printing system comprising the power management apparatus according to claim 16, a plurality of hosts, and a plurality of printers, all being interconnected over a network.

23. A printing system comprising the power management apparatus according to claim 16, a plurality of hosts, a plurality of printers, and the file server according to claim 19, all being interconnected over a network.

24. Computer software recorded on a computer-readable medium and comprising a program for causing a computer to implement the function as the printer power supply control module in the power management apparatus according to claim 16.

* * * * *